United States Patent [19]

Thommes

[11] 4,385,223
[45] May 24, 1983

[54] CIRCUIT FOR USE WITH ARC VOLTAGE CONTROLLERS IN AC GAS TUNGSTEN ARC WELDING

[75] Inventor: James M. Thommes, Cardiss by the Sea, Calif.

[73] Assignee: Cyclomatic Industries, Inc., San Diego, Calif.

[21] Appl. No.: 172,389

[22] Filed: Jul. 25, 1980

[51] Int. Cl.³ ............................................. B23K 9/10
[52] U.S. Cl. .......................... 219/130.01; 219/124.02; 307/110
[58] Field of Search ....................... 219/124.02, 130.01; 307/109, 110

[56] References Cited

U.S. PATENT DOCUMENTS

| | | | |
|---|---|---|---|
| 2,832,000 | 4/1958 | Steele | 314/69 |
| 2,880,374 | 3/1959 | Mulder | 315/205 |
| 2,924,769 | 2/1960 | Harrimon et al. | 307/110 |
| 3,024,354 | 3/1962 | Mierendorf et al. | 219/124.03 |
| 3,041,445 | 6/1962 | Lobosco et al. | 219/124.03 |
| 3,236,997 | 2/1966 | Johnson et al. | 219/124.03 |
| 3,443,057 | 5/1969 | Allen et al. | 83/446 |

Primary Examiner—C. C. Shaw
Attorney, Agent, or Firm—Finnegan, Henderson, Farabow, Garrett & Dunner

[57] ABSTRACT

A signal conditioning circuit for providing a DC voltage to an arc voltage controller for controlling the length of an AC arc of a gas tungsten arc welder. Specifically, a first control circuit is employed which charges to a first value by a signal of a given polarity of one cycle of the AC arc for providing a DC voltage and an additional control circuit is employed for rapidly discharging the first control circuit when the maximum absolute amplitude of a signal of a given polarity of a subsequent cycle of the AC arc is less than the DC voltage provided by the first control circuit. The first control circuit is charged to a higher second value when the maximum absolute amplitude of a signal of a given polarity of a subsequent cycle of the AC arc is greater than the DC voltage provided by the first control circuit. In a preferred embodiment, a doubling circuit is employed to provide a DC voltage roughly equivalent to twice the DC voltage provided by the first control circuit and bias circuitry is employed for providing power to the additional control circuit.

10 Claims, 3 Drawing Figures

| ARC LENGTH (INCHES) | AC (RMS) (VOLTS) | NEG. AVG. (VOLTS) | POS. AVG. (VOLTS) |
|---|---|---|---|
| .05 | 10.7 | 3.5 | 17 |
| .10 | 11.0 | 4.0 | 17 |
| .15 | 11.7 | 5.0 | 17 |
| .20 | 12 | 6.0 | 17 |
| .25 | 11.6 | 7.0 | 17 |
| .30 | 12.0 | 7.5 | 18 |
| .35 | 12.0 | 8.0 | 18 |
| .40 | 13.3 | 10.1 | 19 |
| .45 | 13.7 | 13 | 20 |

CIRCUIT FOR USE WITH ARC VOLTAGE CONTROLLERS IN AC GAS TUNGSTEN ARC WELDING

BACKGROUND OF THE INVENTION

I. Field of the Invention

The present invention relates to a circuit for conditioning an AC arc voltage to provide a DC voltage to an arc voltage controller. Such a device provides a stable signal to allow the arc voltage controller to maintain a preselected arc length, and is particularly suitable for use in automatic gas tungsten arc welding to improve the resulting weld.

II. Description of the Prior Art

Arc voltage control units (AVC's) are commonly used in the welding industry for gas tungsten arc welding (GTAW). The purpose of an AVC is to maintain a constant arc length as a GTAW torch with a tungsten electrode is moved along a weld seam, regardless of any variation in the height of the workpiece relative to the line of travel. This purpose may be accomplished, for example, by a mechanical drive system capable of moving the tungsten electrode closer to or further from the workpiece. A proportional relationship exists between arc length and arc voltage, thus, maintaining the welding arc voltage at a preselected reference arc voltage maintains the desired arc length.

There are three general methods of current delivery to the arc in GTAW. The most prevalent are DC straight polarity (DCSP) and DC reverse polarity (DCRP). Most GTAW is done with DCSP (electrode negative with respect to the workpiece). However, with some metals such as aluminum and magnesium which develop refractory oxides, DCSP is inadequate. DCRP may be used to remove the oxide while welding, however, in this mode heat transfer to the workpiece is poor thus limiting DCRP to thin gauge material.

AC welding achieves the welding penetration of DCSP on the negative half-cycle and the cleaning action of DCRP (electrode positive with respect to the workpiece) on the positive half cycle and is, therefore, a superior mode of welding such metals as aluminum and magnesium.

AVC's are specifically designed for DC welding, either DCSP or DCRP, but do not adapt readily to AC welding. To allow an AVC to operate with AC GTAW requires a signal conditioner which converts AC arc voltage information to a DC level which can be used effectively by an AVC.

U.S. Pat. No. 2,671,843 to Steele recognizes that the positive half cycle of AC arc voltage is not steady or uniform and, hence, in order to obtain a useful signal from AC arc voltage, only the negative half cycle should be used. As explained in Steele, as current changes from electrode negative to electrode positive, there is an interruption in current flow causing the arc voltage to have a spike in the positive half cycle, whereas there is no such interruption when the current changes from electrode positive to electrode negative providing a clean signal in the negative half cycle. The result is that, for reliability, only the negative half cycle of an AC arc voltage should be used.

Accordingly, Steele turns to the use of a half-wave rectifier to provide a DC voltage corresponding to the negative half cycle of the AC arc voltage. In order to provide a steady DC signal which is required to avoid oscillations in the AVC and subsequent hunting of the electrode, Steele also includes a filter to smooth out the half-wave voltage and attain a smoother, steady DC voltage.

However, the use of a filter introduces a delay in moving the electrode in response to a change in the arc voltage. Such a delay can cause instability in the overall control system. It can also cause the electrode to dive into the workpiece at the end of the weld as the filter would still present a control voltage to the AVC when the arc voltage is removed.

SUMMARY OF THE INVENTION

It is, accordingly, an object of the present invention to provide a signal conditioner which can provide a steady DC voltage to an AVC for use in controlling the arc length of an AC GTAW.

Another object of the present invention is to provide such a signal conditioner wherein the voltage resulting from sensing the negative half cycle is doubled to place the voltage in the normal operating range of currently available AVC's.

A further object of the present invention is to provide such a signal conditioner which requires no external power supply but instead is self-powered from the AC arc voltage being sensed.

It is also an object of the present invention to provide such a signal conditioner which is able to withstand relatively severe surges of current or voltage which commonly occurs to the types of environments in which this apparatus is intended to be applied.

A still further object of the present invention is to provide such a signal conditioner so designed and constructed as to facilitate its application and installation into both new AVC's at the factory level and into old AVC's already in the field, by personnel having a minimum of mechanical aptitude and utilizing generally available tools.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a signal conditioning circuit is provided which comprises: input means for receiving an AC signal; first control means connected to the input means and having capacitive means which are charged to a first value by a signal of a given polarity of one cycle of the AC signal for providing a first DC voltage; second control means connected to the input means and the first control means and operable to rapidly discharge the first control means to a second DC voltage when the maximum absolute amplitude of a signal of the given polarity of a subsequent cycle of the AC signal is less than the first DC voltage; the first control means being charged to a second value which is higher than said first value when the maximum absolute amplitude of a signal of the given polarity of a subsequent cycle of the AC signal is greater than the first DC voltage; and output means connected to receive the DC voltage provided by the first control means.

Preferably the signal conditioning circuit also includes doubling means interposed between the first control means and the output means and having capacitive means charged by a signal of an opposite polarity of one cycle of the AC signal for providing a third DC voltage wherein the third DC voltage is roughly equal to the voltage provided by the first control means.

In a preferred embodiment, the signal conditioner further includes bias means connected to the input means for providing power to the second control means.

BRIEF DESCRIPTION OF THE DRAWINGS

The accompanying drawings, which are incorporated and constitute a part of this specification, illustrate a preferred embodiment of the invention and, together with the general description of the invention given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figures 1, 2:
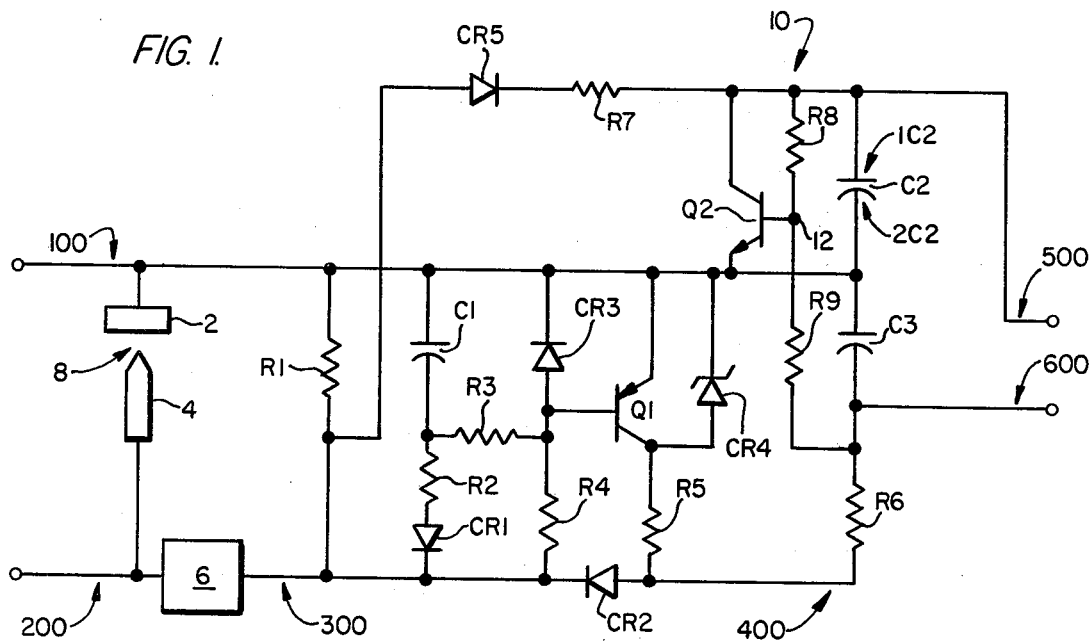
FIG. 1 is a schematic diagram of a circuit in accordance with the teachings of the present invention.
FIG. 2 is a table of voltages corresponding to various arc lengths.

In FIG. 1 there is illustrated a signal conditioning apparatus incorporating the teachings of the present invention. In a typical application, an AC arc voltage (not shown) is applied to lines 100 and 200 of the circuit of FIG. 1. A workpiece 2 is electrically connected to line 100 and a torch (not shown) with an electrode 4 is electrically connected to line 200. Line 200 is coupled to line 300 through a filter 6 which, as is known to those of skill in the art, filters out the high frequency signals used to initiate an arc (not shown) in gap 8.

As is further illustrated in FIG. 1, line 100 is coupled to line 300 through resistor R1 in parallel with the series combination of capacitor C1, resistor R2 and diode CR1. As is understood by those of skill in the art, the combination of resistor R1, capacitor C1, resistor R2 and diode CR1 operates as a filtered half-wave rectifier to provide power for the operation of the rest of the apparatus of FIG. 1 which will be described more fully below.

Referring to FIG. 2, there is shown a table of measured arc voltages for various arc lengths. The arc length is equal to the length of gap 8 of FIG. 1, and the arc voltages are measured across the gap 8. The column AC(RMS) represents the measured root-mean-square voltage across gap 8 for various arc lengths. The column NEG. AVG. represents the measured voltage across gap 8 for various arc lengths when line 100 is more positive with respect to line 200 of FIG. 1, and the column POS. AVG. represents the measured voltage across gap 8 for various arc lengths when line 200 is more positive with respect to line 100.

Figure 3:
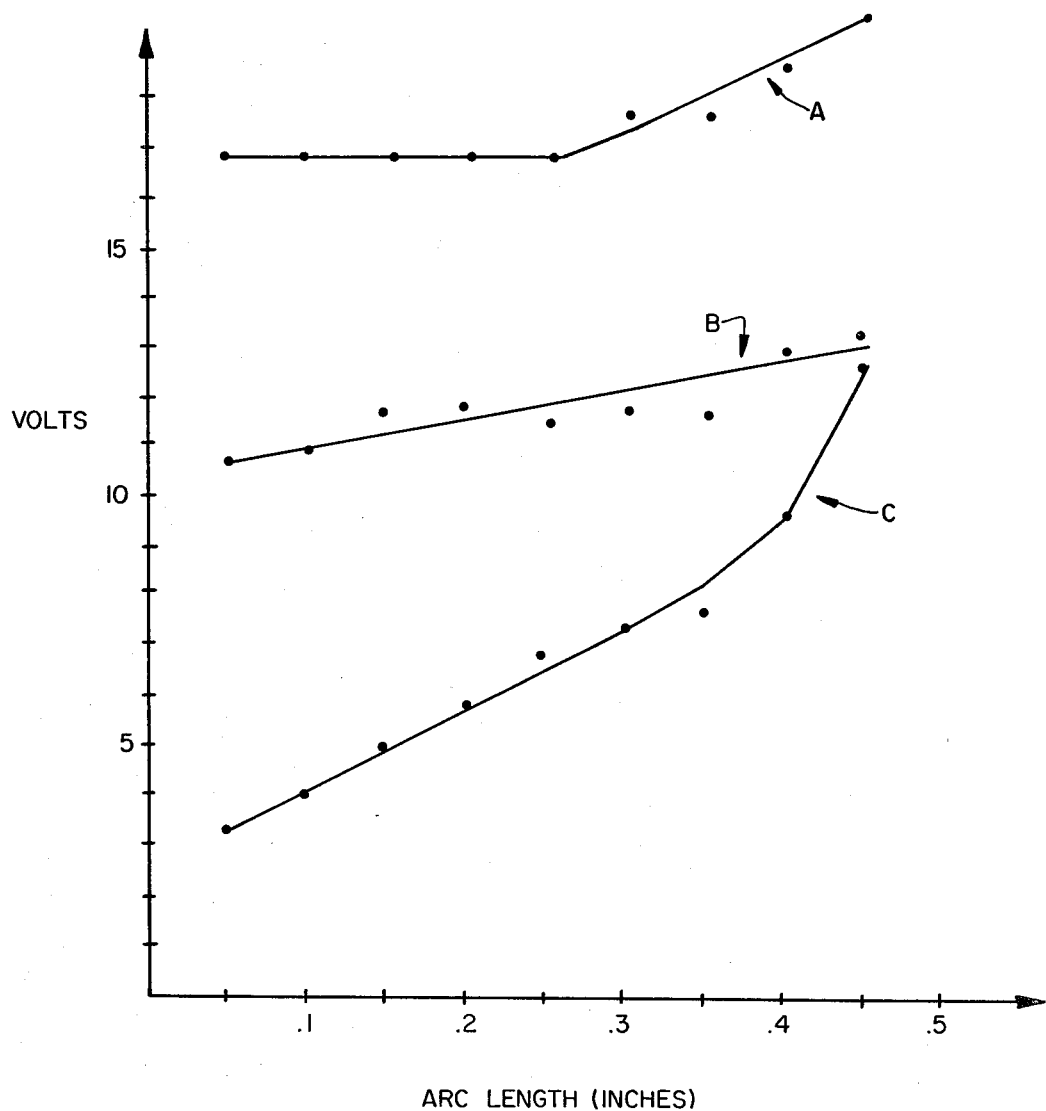
FIG. 3 is a graph depicting the relationship of voltage to arc length as tabulated in FIG. 2.

The data represented in columns AC(RMS) and POS. AVG. are approximations as the value was not constant at any given arc length. Note that at any given value of arc length, POS. AVG. is greater than NEG. AVG. Moreover, due to emission mechanisms, the relationships are different for each type of voltage measured. For example, in FIG. 3 there is shown lines A, B and C corresponding to POS. AVG., AC(RMS) and NEG. AVG., respectively. Although line B appears to indicate that the value of AC(RMS) measured is close to being linearly proportional to arc length, the relatively wide fluctuations in voltages at specific arc lengths makes the use of AC(RMS) a poor indicator of arc length. Lines B and C indicate that NEG. AVG. is linear over greater variations of arc length than POS. AVG. The greater linearity of NEG. AVG. and the fluctuations in POS. AVG. at any given arc length render NEG. AVG. a better indicator of arc length.

The operation of the apparatus of FIG. 1 can be divided into two modes, the positive half-cycle mode (PHCM) and the negative half-cycle mode (NHCM). During PHCM, line 200 is positive with respect to line 100 while during NHCM, line 100 is positive with respect to line 200. Diode CR1 is connected between resistor R2 and line 300 such that capacitor C1 can charge through resistor R2 during NHCM but cannot discharge through resistor R2 during PHCM, thus, developing a DC potential with line 100 being more positive with respect to line 300.

As illustrated in FIG. 1, the base of a PNP transistor Q1 is coupled to line 300 through resistor R4, to the junction of capacitor C1 and resistor R2 through resistor R3, and to line 100 through diode CR3. Diode CR3 is connected such that current will flow from line 300 to line 100 through diode CR3 and resistor R4 to protect PNP transistor Q1 from excessive currents when line 300 is more positive with respect to line 100. The emitter of PNP transistor Q1 is coupled directly to line 100 and the collector of PNP transistor Q1 is coupled to line 100 through zener diode CR4 which provides overvoltage protection to the collector of PNP transistor Q1 when line 100 is more positive with respect to line 300.

Line 300 is coupled to line 400 through diode CR2 and the collector of PNP transistor Q1 is coupled to line 400 through resistor R5. Coupling line 100 to line 400 is the series combination of capacitor C3 and resistor R6 with capacitor C6 coupled directly to line 100 and resistor R6 coupled directly to line 400.

During NHCM, PNP transistor Q1 is saturated ON through base drive from resistors R3 and R4. Referring again to FIG. 2, if the arc length increases, NEG. AVG. increases, thus, capacitor C3 must charge to the new higher voltage. Conversely, if the arc length decreases, NEG. AVG. decreases, and capacitor C3 must discharge to the new lower voltage. Thus, capacitor C3 either charges to a voltage approximately equal to NEG. AVG. through resistor R6 and diode CR2, or discharges to a voltage approximately equal to NEG. AVG. through resistors R5 and R6 and conducting PNP transistor Q1.

During PHCM, the voltage applied through resistor R4 from line 300 is positive with respect to line 100, overcoming the base bias supplied by capacitor C1 and resistor R3, thus, turning PNP transistor Q1 to the OFF state. From the data in FIG. 2, it is seen that this will always be true as at any given arc length, POS. AVG. is greater than NEG. AVG.

Also, during PHCM, diode CR2 is back biased causing capacitor C3 to retain its charge, thus resulting in a familiar "sample and hold" function.

As further illustrated in FIG. 1, line 300 is coupled to terminal 1C2 of capacitor C2 through the series combination of diode CR5 and resistor R7. Terminal 2C2 of capacitor C2 is directly coupled to line 100. Diode CR5 allows capacitor C2 to charge during PHCM but not to discharge during NHCM. The common junction 10 of capacitor C2 and resistor R7 is coupled directly to the collector of NPN transistor Q2 while the emitter of NPN transistor Q2 is coupled directly to line 100, thus, allowing NPN transistor Q2 to act as a shunt across capacitor C2.

The base of NPN transistor Q2 is coupled to junction 10 through resistor R8 and to the junction of capacitor C3 and resistor R6 through resistor R9. As is well known to those of skill in the art, the series combination of resistors R8 and R9 forms a voltage divider such that when resistors R8 and R9 are of equal resistance, as they are in a preferred embodiment, the voltage at the junction 12 of resistors R8 and R9 is equal to one-half the voltage across the series combination of capacitors C2 and C3.

As described earlier, during NHCM, capacitor C2 does not charge; however, during PHCM, capacitor C2 will charge. When the voltage across capacitor C2 is less than or equal to the voltage across capacitor C3, the voltage at junction 12 with respect to line 100 is insufficient to cause NPN transistor Q2 to conduct. However, when the voltage across capacitor C2 is greater than the voltage across capacitor C3, the voltage at junction 12 is more positive with respect to line 100 casing conduction of NPN transistor Q2 which shunts away excess charging current from capacitor C2. This phenomona limits the voltage across capacitor C2 to approximately the same voltage as appears across capacitor C3.

Thus, the voltage across the series combination of capacitors C2 and C3 approaches twice the voltage across capacitor C3. This phenomena will hold true since, as reflected by FIG. 2, the charging voltage for capacitor C2, or POS. AVG., is always greater than the value attained by capacitor C3, or NEG. AVG.

The voltage across the series combination of capacitors C2 and C3 is fed to a control unit which constitutes no part of the present invention through output lines 500 and 600. Output line 500 is coupled to junction 10 while output 600 is coupled to the junction of capacitor C3 and resistor R6. Thus, the invention provides a steady DC signal across output lines 500 and 600 which is proportional to NEG. AVG. with a gain of approximately two. As was described earlier, FIGS. 2 and 3 show that NEG. AVG. bears a better overall relationship to arc length than either AC(RMS) or POS. AVG., and NEG. AVG. is relatively constant at any given arc length. Thus, the output provides a DC control signal which is proportional to the arc length.

If the earlier applied AC arc voltage (not shown) is interrupted, PNP transistor Q1 is held ON through the forward bias supplied by capacitor C1 and resistor R3. Thus, PNP transistor Q1 discharges capacitor C3 through resistors R5 and R6 rapidly. Capacitor C2 is also rapidly discharged due to the phenomenon described above. The rapid discharge prevents electrode 4 from diving into workpiece 2 when a typical welding operation is completed by extinguishing the arc (not shown).

Although the preferred embodiment is described with respect to controlling the position of an AC gas tungsten arc welding electrode with a DC arc voltage controller, there are a multiplicity of other possible applications, and the system of the present invention may be utilized whenever an AC signal must be conditioned to operate a DC controller.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

I claim:

1. A signal conditioning circuit responsive to an AC signal to develop DC voltages proportional to the average negative half-cycle voltages of the AC signal, comprising:

input means for receiving said AC signal, first capacitive means, first control means connected to the input means and the first capacitor means, the first capacitive means being charged by the AC signal through the first control means, the first control means being operative to compare the instantaneous voltage value of the AC signal to the voltage on the first capacitor means and, if the instantaneous value of the AC signal is greater than the voltage on the first capacitor means, to cause continued charging of the first capacitive means, second control means connected to the input means and the first control means, the first control means controlling the second control means to discharge the first capacitive means when the instantaneous value of the voltage of the AC signal is less than the voltage on the first capacitive means, the first and second control means thereby controlling the first capacitive means to develop DC voltages proportional to the average of the negative half-cycles of the AC signal, and output means connected to the first capacitive means to receive the DC voltages therefrom which are proportional to the average of the negative half-cycles of the AC signal.

2. The signal conditioning circuit of claim 1 further comprising doubling means interposed between said first control means and said output means for providing DC voltages having a proportional value substantially double the average of the negative half-cycles of the AC signal.

3. The signal conditioning circuit of claim 2 wherein said doubling means includes second capacitive means which are charged by a signal of an opposite polarity of one cycle of said AC signal.

4. The signal conditioning circuit of claim 3 further comprising bias means connected to said input means for providing power to said second control means.

5. The signal conditioning circuit of claim 1 further comprising bias means connected to said input means for providing power to said second control means.

6. The signal conditioning circuit of claim 2 further comprising bias means connected to said input means for providing power to said second control means.

7. The signal conditioning circuit of claim 1, 2, 3, 5, 6 or 4 wherein said second control means completely discharged said capacitive means when said AC signal is removed.

8. A signal conditioning circuit responsive to an AC arc voltage to develop DC voltages proportional to the average negative half-cycle voltages of the AC arc voltage, comprising:

input means for receiving said AC signal, first capacitive means, first control means connected to the input means and the first capacitive means, the first capacitive means being charged by the AC signal through the first control means, the first control means being operative to compare the instantaneous voltage value of the AC arc voltage to the voltage on the first capacitive means and, if the instantaneous value of the AC arc signal is greater than the voltage on the capacitor, to cause continued charging of the first capacitive means, second control means connected to the input means and the first control means, the first control means controlling the second control means to discharge the first capacitive means when the instantaneous value of the voltage of the AC arc voltage is less than the voltage on the first capacitive means, the first and second control means thereby controlling the first capacitive means to develop DC voltages proportional to the average of the negative half-cycles of the AC arc voltage, and output means connected to the first capacitive means to receive the DC voltages therefrom which are proportional to the average of the negative half-cycles of the AC arc voltage.

9. The signal conditioning circuit of claim 8 further comprising doubling means interposed between said first control means and said output means for providing DC voltages having a proportional value substantially double the average of the negative half-cycles of the AC signal.

10. The signal conditioning circuit of claim 8 wherein said doubling means includes second capacitive means responsive to the positive half cycle of said AC arc voltage.

* * * * *

UNITED STATES PATENT AND TRADEMARK OFFICE
CERTIFICATE OF CORRECTION

PATENT NO. : 4,385,223
DATED : May 24, 1983
INVENTOR(S) : James M. Thommes

It is certified that error appears in the above-identified patent and that said Letters Patent is hereby corrected as shown below:

Claim 1, line 14, "capacitor" should read -- capacitive --.

Claim 7, line 3, "discharged" should read -- discharges --.

Signed and Sealed this

Twenty-seventh Day of March 1984

[SEAL]

Attest:

GERALD J. MOSSINGHOFF

Attesting Officer  Commissioner of Patents and Trademarks